(12) United States Patent
Kobayashi et al.

(10) Patent No.: US 12,044,290 B2
(45) Date of Patent: Jul. 23, 2024

(54) SPEED REDUCTION MECHANISM

(71) Applicant: MITSUBA Corporation, Gunma (JP)

(72) Inventors: Motoaki Kobayashi, Gunma (JP); Teppei Tokizaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/037,564

(22) PCT Filed: Mar. 31, 2022

(86) PCT No.: PCT/JP2022/016621
§ 371 (c)(1),
(2) Date: May 18, 2023

(87) PCT Pub. No.: WO2023/037638
PCT Pub. Date: Mar. 16, 2023

(65) Prior Publication Data
US 2024/0003408 A1    Jan. 4, 2024

(30) Foreign Application Priority Data

Sep. 8, 2021 (JP) .................................. 2021-146253

(51) Int. Cl.
*F16H 1/08* (2006.01)
*F16H 55/08* (2006.01)
(52) U.S. Cl.
CPC .............. *F16H 1/08* (2013.01); *F16H 55/08* (2013.01)
(58) Field of Classification Search
CPC ..... F16H 55/08; F16H 1/08; F16H 2055/0893
See application file for complete search history.

(56) References Cited

U.S. PATENT DOCUMENTS

| 676,641 | A | * | 6/1901 | Venn | ....................... F16H 55/08 |
| | | | | | 74/466 |
| 3,481,215 | A | | 12/1969 | Howell | |
| 8,789,437 | B2 | * | 7/2014 | Stanovskoy | ............ F16H 55/08 |
| | | | | | 74/462 |
| 10,550,914 | B2 | * | 2/2020 | Chen | ........................ F16H 1/06 |
| 11,719,310 | B2 | * | 8/2023 | Tokizaki | ................ H02K 7/003 |
| | | | | | 74/414 |
| 2010/0095792 | A1 | * | 4/2010 | Stanovskoy | .............. F16H 1/08 |
| | | | | | 74/423 |
| 2021/0021174 | A1 | * | 1/2021 | Kojima | ................ H02K 5/1735 |

FOREIGN PATENT DOCUMENTS

| JP | 2019184060 | 10/2019 |
| JP | 2021055726 | 4/2021 |

OTHER PUBLICATIONS

"International Search Report (Form PCT/ISA/210) of PCT/JP2022/016621", mailed on Jun. 14, 2022, with English translation thereof, pp. 1-4.

* cited by examiner

*Primary Examiner* — Jake Cook
(74) *Attorney, Agent, or Firm* — JCIPRNET

(57) ABSTRACT

When viewed in the axial direction of a pinion gear (31), the center (C1) of a pinion main body (31b) and the center (C2) of a helical tooth (31c) are offset from each other, the helical tooth (31c) has a larger diameter than the pinion main body (31b), and the pinion main body (31b) partially protrudes outside an imaginary circle (VC) that forms the outer shape of the helical tooth (31c). A cross-sectional shape of the pinion gear (31) can be made non-circular with the pinion main body (31b) partially protruding outside the imaginary circle (VC) that forms the outer shape of the helical tooth (31c).

4 Claims, 9 Drawing Sheets

SPEED REDUCTION MECHANISM

CROSS-REFERENCE TO RELATED APPLICATION

This application is a 371 application of the International PCT application serial no. PCT/JP2022/016621, filed on Mar. 31, 2022, which claims the priority benefit of Japan Patent Application No. 2021-146253, filed on Sep. 8, 2021. The entirety of each of the above-mentioned patent applications is hereby incorporated by reference herein and made a part of this specification.

TECHNICAL FIELD

The present invention relates to a speed reduction mechanism including a first gear and a second gear.

RELATED ART

Conventionally, a drive source of a wiper device or a power window device or the like mounted on a vehicle such as an automobile is provided with a speed reduction mechanism in order to obtain a large output while being compact. Such a speed reduction mechanism used in an in-vehicle drive source is described in, for example, Patent Document 1.

The speed reduction mechanism described in Patent Document 1 includes a pinion gear (first gear) having one helical tooth and a helical gear (second gear) having a plurality of oblique teeth. By meshing the one helical tooth with the plurality of oblique teeth, high speed rotation of the pinion gear becomes low speed rotation of the helical gear. Accordingly, a speed reduction mechanism is realized including gears having shapes suitable for meshing while increasing in speed reduction ratio.

PRIOR-ART DOCUMENTS

Patent Documents

Patent Document 1: Japanese Patent Laid-open No. 2019-184060

SUMMARY OF THE INVENTION

Problems to be Solved by the Invention

To realize the technique described in Patent Document 1, for example, it is conceivable to make the pinion gear, which is an elongated part, made of steel, and to make the helical gear, which is a large disk-shaped part, made of resin. Moreover, in the speed reduction mechanism including the pinion gear and the helical gear, since a relatively large speed reduction ratio can be easily achieved, sufficient meshing strength between both gears is required.

However, in the technique described in Patent Document 1, in a direction intersecting an axial direction, a portion (core circle) serving as a "core" arranged in a rotation center of the pinion gear is arranged radially inside an imaginary circle (tooth profile circle) forming an outer shape of the helical tooth. Hence, in the case where the speed reduction mechanism is formed in the same physical size as conventionally, for example, if the oblique tooth of the helical gear is increased in thickness accordingly, the helical tooth is reduced in diameter. Accordingly, the portion serving as the "core" arranged in the rotation center of the pinion gear may become thin. That is, ensuring the strength of the helical gear and ensuring the strength of the pinion gear are in a trade-off relationship.

An object of the present invention is to provide a speed reduction mechanism in which sufficient meshing strength is provided between a first gear and a second gear to improve power transmission efficiency between both gears, and a relatively large speed reduction ratio can be easily handled.

Means for Solving the Problems

In one aspect of the present invention, a speed reduction mechanism includes a first gear and a second gear. The speed reduction mechanism is characterized in the following. The first gear includes: a first main body portion, having a circular cross section in a direction intersecting an axial direction of the first gear; and one helical tooth, helically provided around the first main body portion and having a crescent-shaped cross section in the direction intersecting the axial direction of the first gear. The second gear includes: a second main body portion, having a circular cross section in a direction intersecting an axial direction of the second gear; and a plurality of oblique teeth, provided around the second main body portion and meshed with the helical tooth. When viewed in the axial direction of the first gear, a center of the first main body portion and a center of the helical tooth are offset from each other, the helical tooth has a larger diameter than the first main body portion, and the first main body portion partially protrudes outside an imaginary circle forming an outer shape of the helical tooth.

Effects of the Invention

According to the present invention, the shape of the first gear when viewed in the axial direction of the first gear can be made a shape (non-circular shape) in which the first main body portion (core circle) partially protrudes outside the imaginary circle (tooth profile circle) forming the outer shape of the helical tooth. Accordingly, the strength of the first gear can be improved while an increase in the diameter of the first gear is suppressed. Accordingly, the strength of both the first gear and the second gear can be improved, and power transmission efficiency between both gears can be improved. Thus, it is possible to easily handle a relatively large speed reduction ratio.

Figure 6:
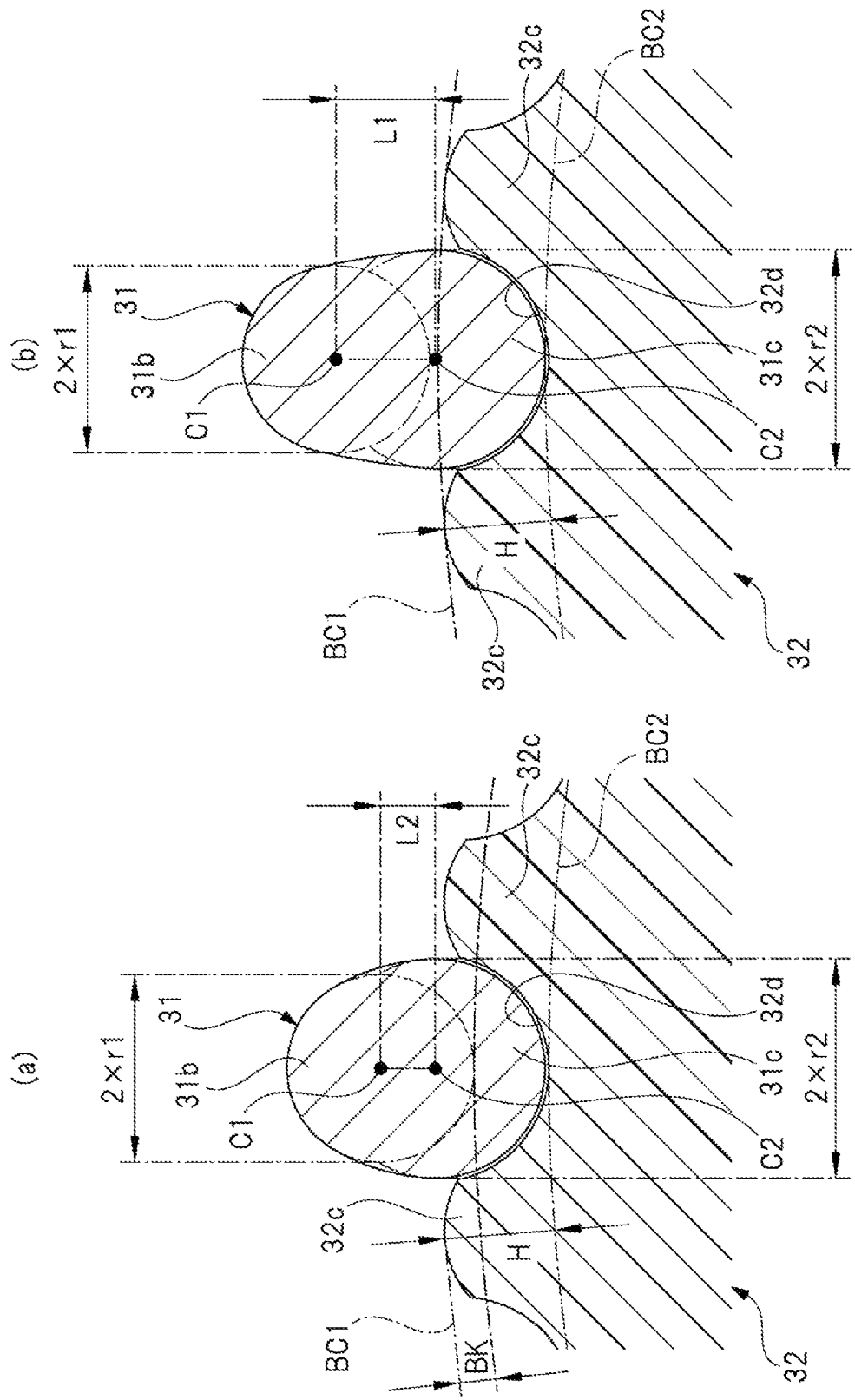

(a) and (b) of FIG. 6 are cross-sectional views describing a design concept of the speed reduction mechanism.

Figure 7:
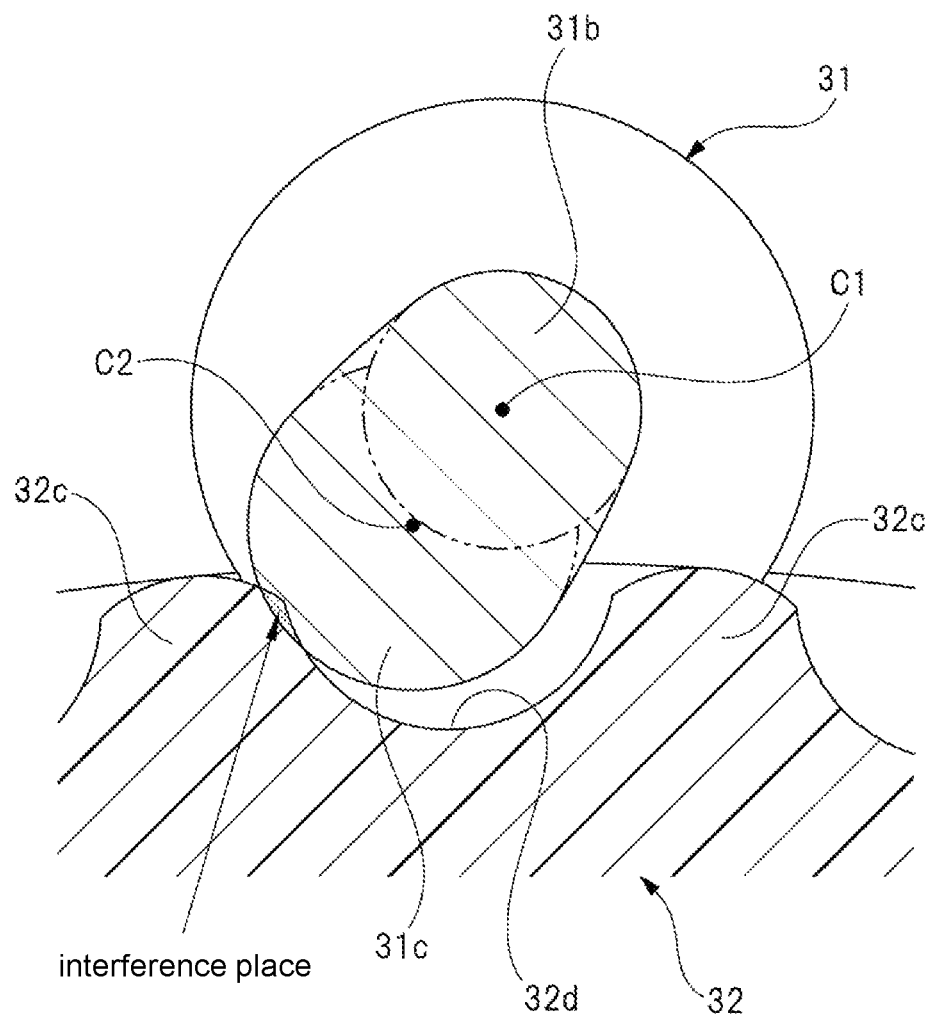

FIG. 7 is a cross-sectional view describing a portion finely adjusted by simulation.

Figure 8:
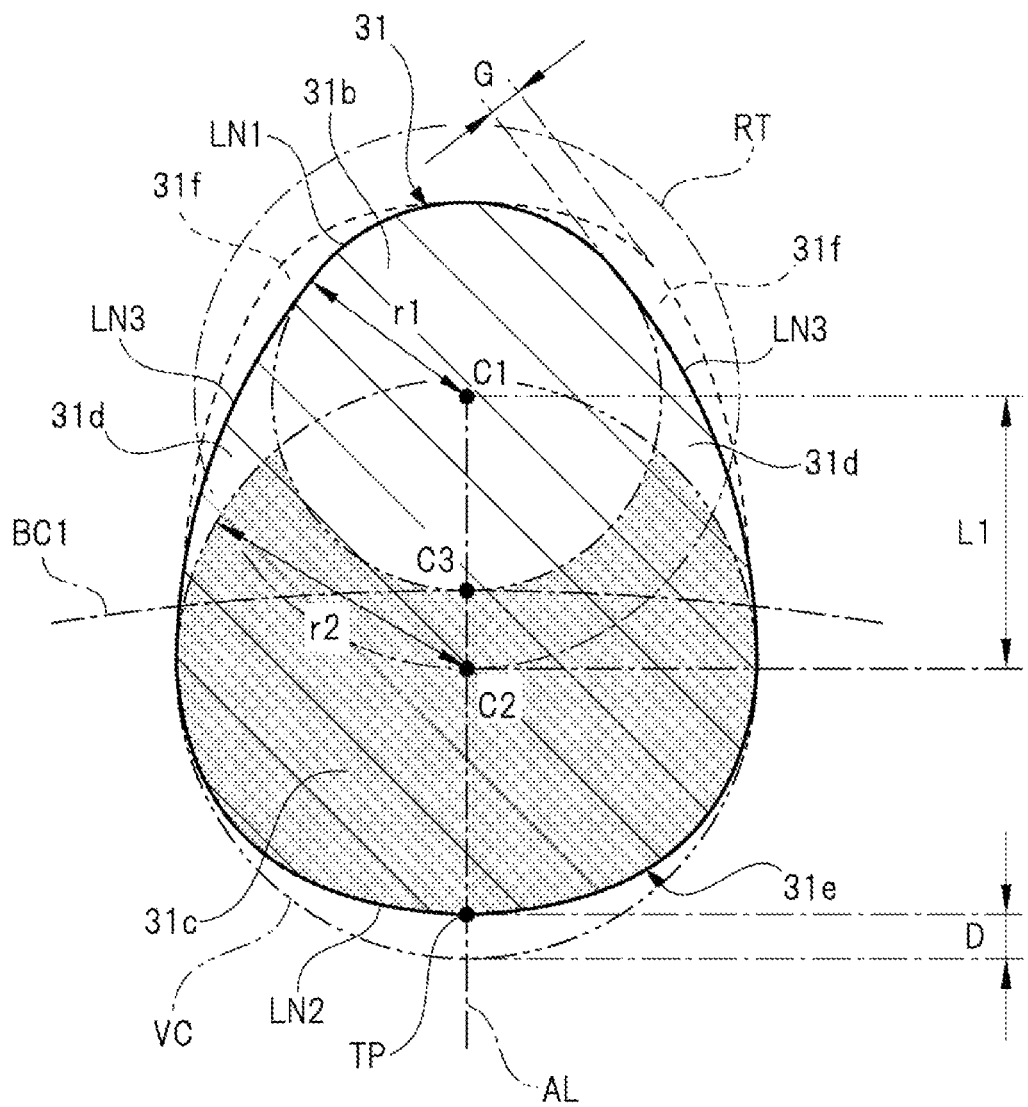

FIG. 8 is a cross-sectional view describing parameters (data of each part) of a pinion gear.

Figure 9:
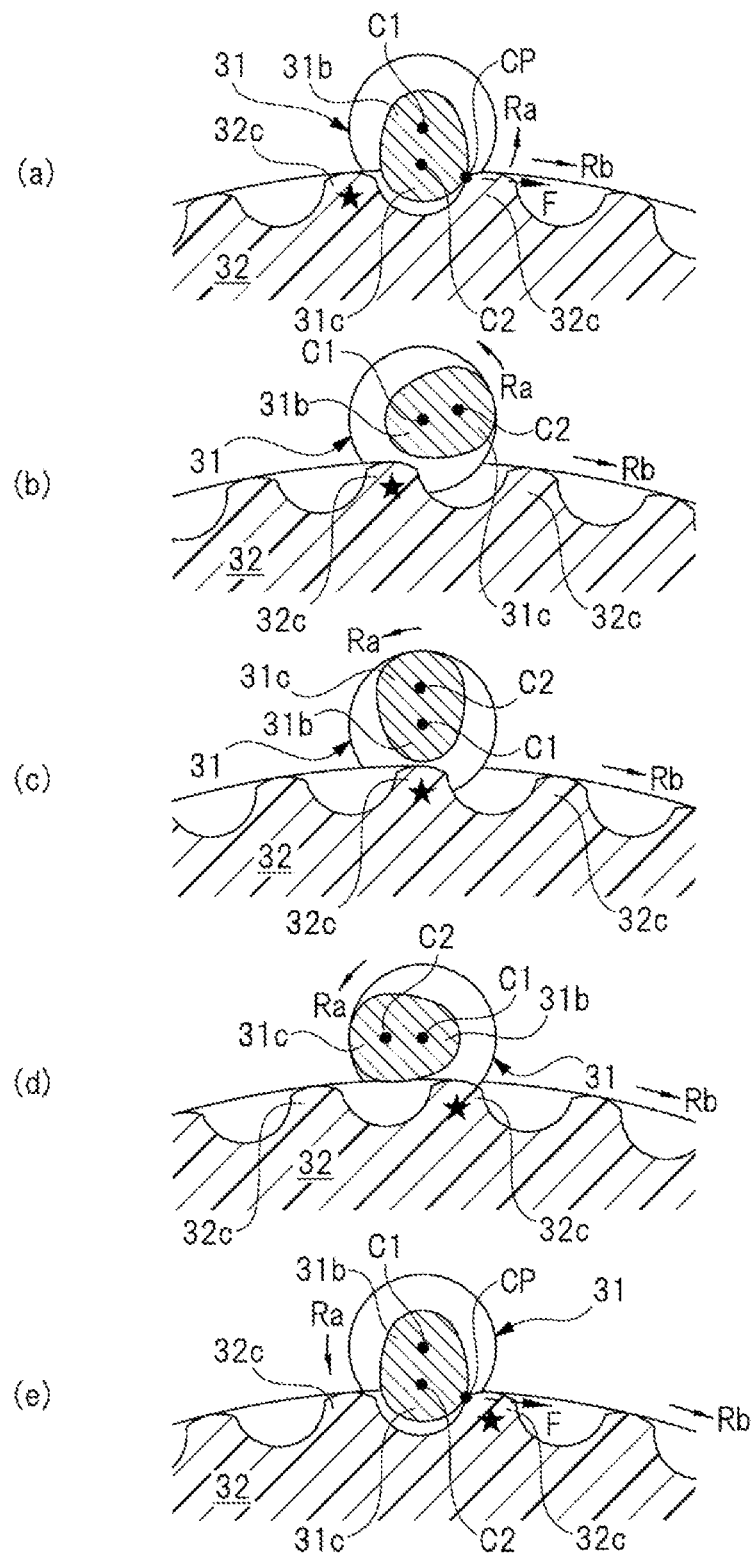

(a) to (e) of FIG. 9 are explanatory diagrams describing an operation of the speed reduction mechanism.

DESCRIPTION OF THE EMBODIMENTS

Hereinafter, one embodiment of the present invention will be described in detail with reference to the drawings.

Figure 1:
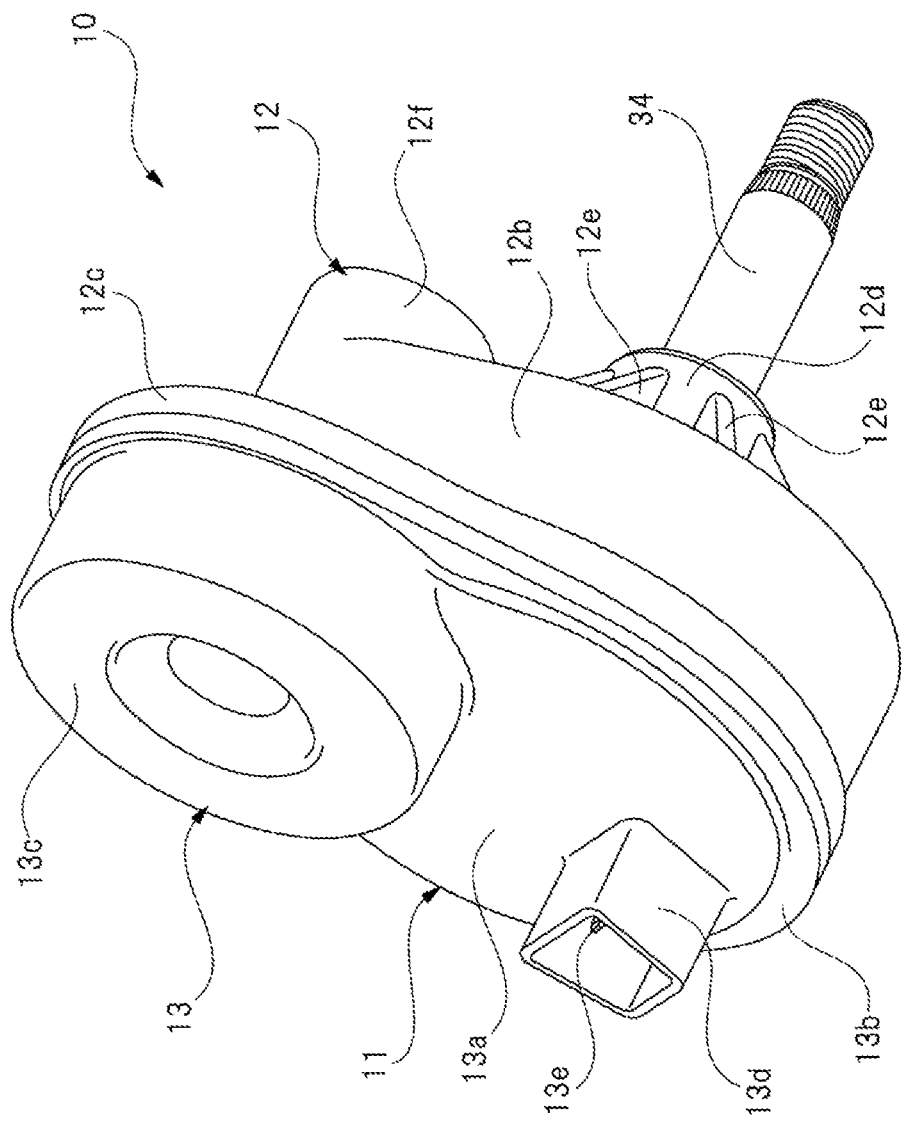
FIG. 1 is a perspective view of a motor with a speed reduction mechanism as viewed from a connector connection part side.
Figure 2:
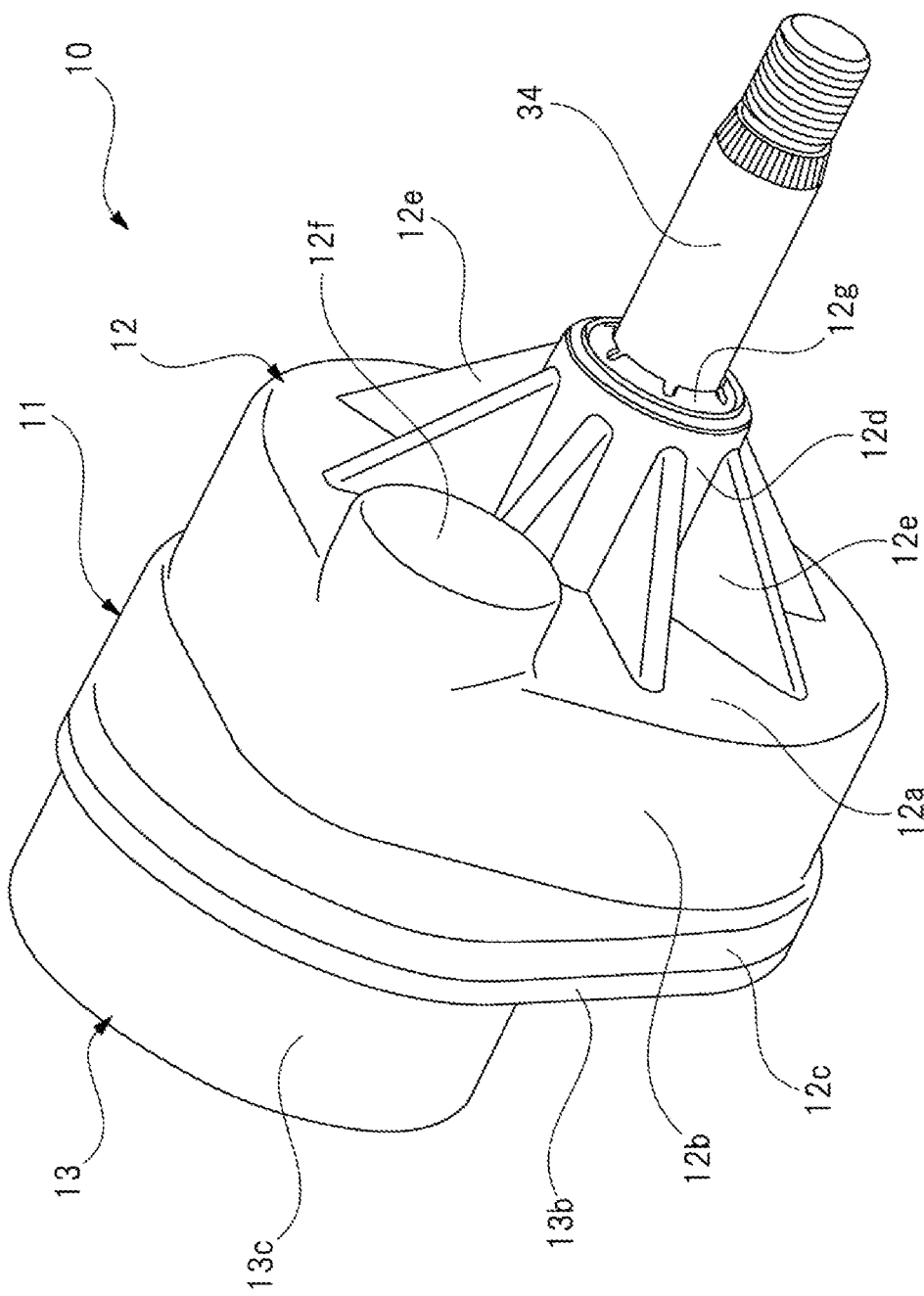
FIG. 2 is a perspective view of the motor with the speed reduction mechanism as viewed from an output shaft side.
Figure 3:
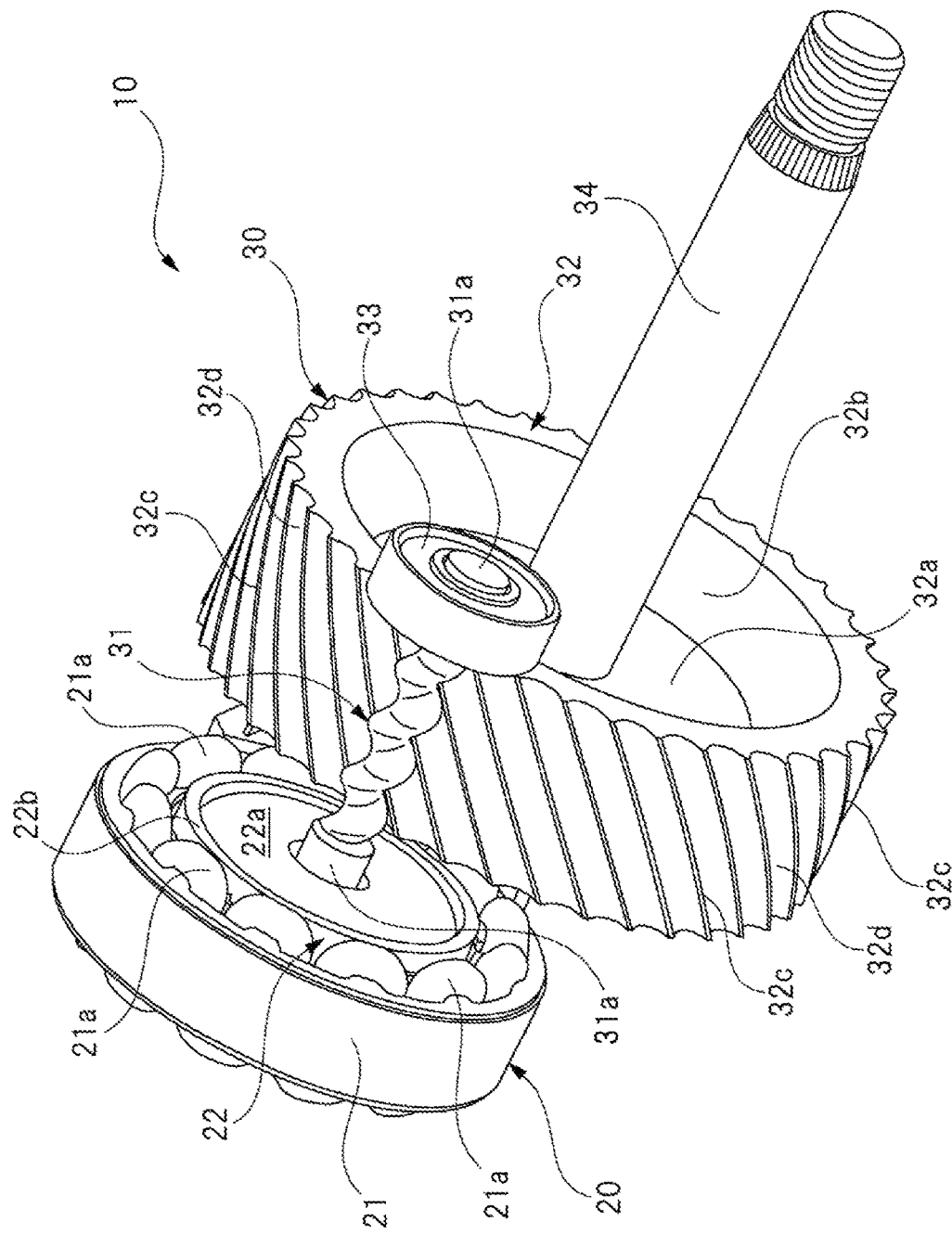
FIG. 3 is a perspective view describing an internal structure of the motor with the speed reduction mechanism.
Figure 4:
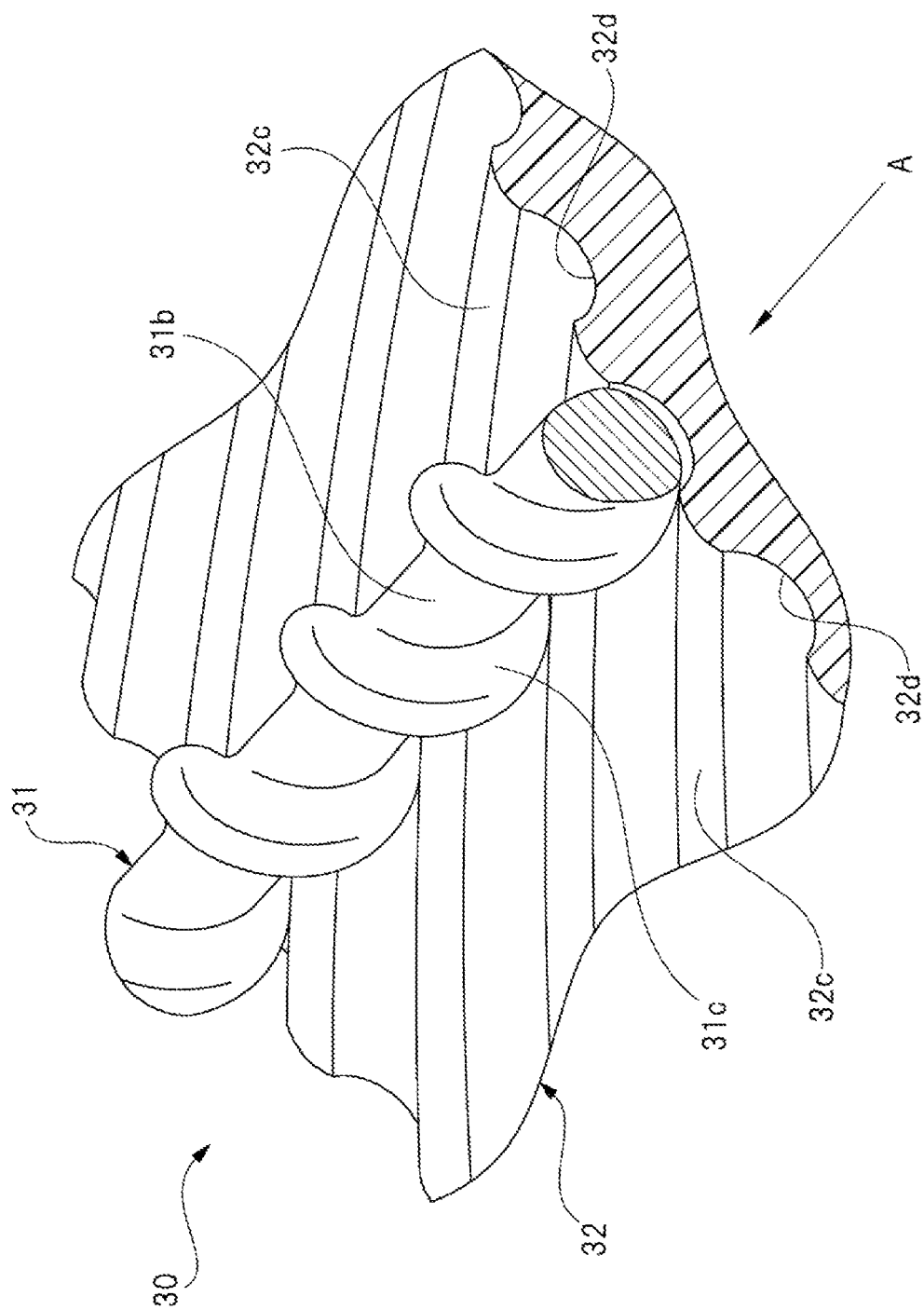
FIG. 4 is an enlarged perspective view of a meshing portion of the speed reduction mechanism.
Figure 5:
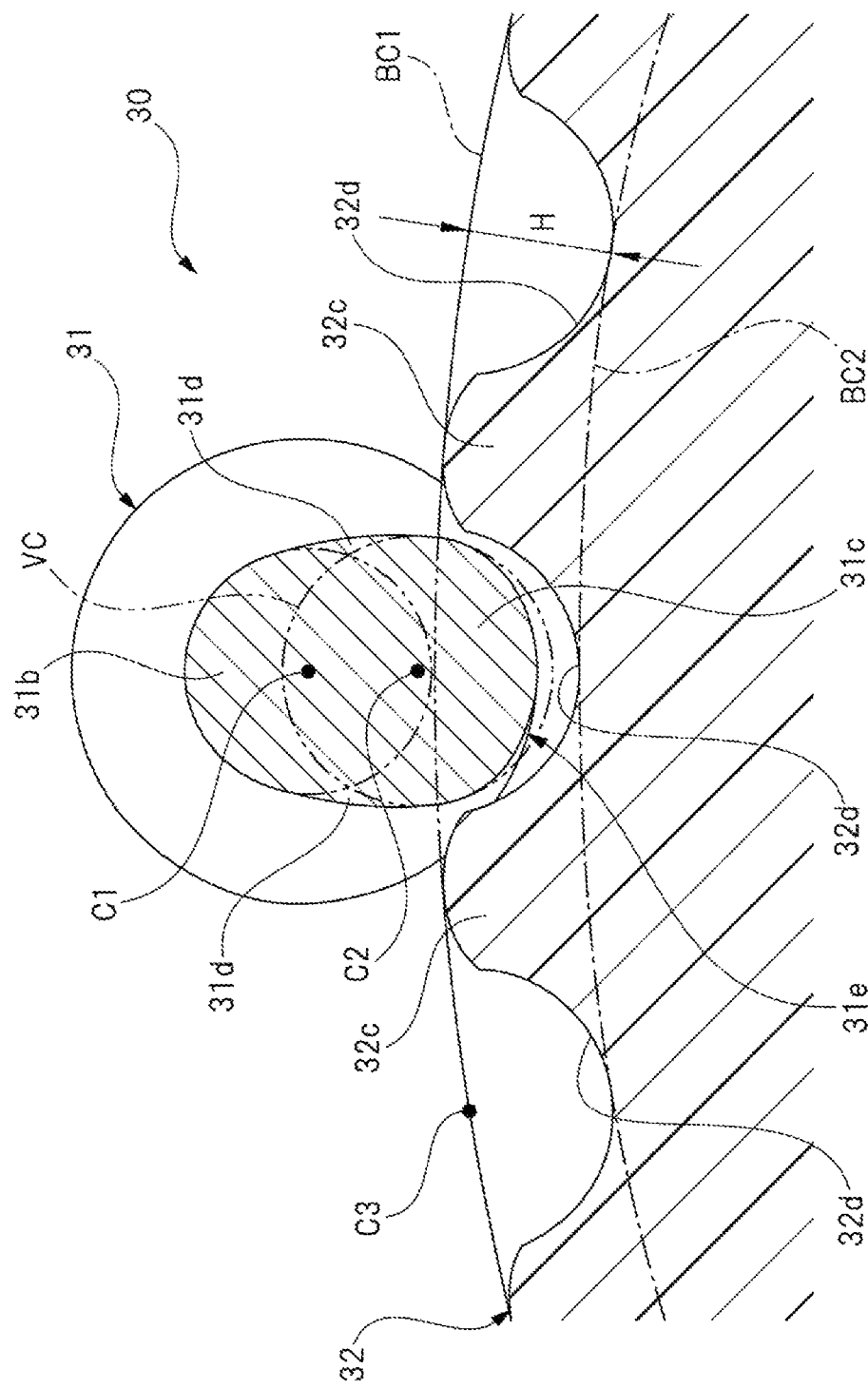
FIG. 5 is a view from the direction of arrow A of FIG. 4.

FIG. 1 illustrates a perspective view of a motor with a speed reduction mechanism as viewed from a connector connection part side. FIG. 2 illustrates a perspective view of the motor with the speed reduction mechanism as viewed from an output shaft side. FIG. 3 illustrates a perspective view describing an internal structure of the motor with the speed reduction mechanism. FIG. 4 illustrates an enlarged perspective view of a meshing portion of the speed reduction mechanism. FIG. 5 illustrates a view from the direction of arrow A of FIG. 4. (a) and (b) of FIG. 6 illustrate cross-sectional views describing a design concept of the speed reduction mechanism. FIG. 7 illustrates a cross-sectional view describing a portion finely adjusted by simulation. FIG. 8 illustrates a cross-sectional view describing parameters (data of each part) of a pinion gear. (a) to (e) of FIG. 9 illustrate explanatory diagrams describing an operation of the speed reduction mechanism.

A motor 10 with a speed reduction mechanism illustrated in FIG. 1 and FIG. 2 is used in, for example, a drive source of a wiper device (not illustrated) mounted on a vehicle such as an automobile. Specifically, the motor 10 with the speed reduction mechanism causes a wiper member (not illustrated) arranged on a front side of a windshield (not illustrated) and swingably provided on the windshield to swing within a predetermined wiping range (between a lower reversing position and an upper reversing position).

The motor 10 with the speed reduction mechanism includes a housing 11 forming its outer shell. As illustrated in FIG. 3, a brushless motor 20 and a speed reduction mechanism 30 are rotatably accommodated inside the housing 11. Here, as illustrated in FIG. 1 and FIG. 2, the housing 11 is formed of a casing 12 made of aluminum and a cover member 13 made of plastic.

The casing 12 is formed in a substantially bowl shape by injection molding a molten aluminum material. Specifically, the casing 12 includes a bottom wall 12a, a sidewall 12b integrally provided around the bottom wall 12a, and a case flange 12c provided on an opening side (left side in the drawing) of the casing 12.

A boss 12d of a cylindrical shape rotatably supporting an output shaft 34 is integrally provided in a substantially central portion of the bottom wall 12a. A bearing member (not illustrated) of a cylindrical shape, which is so-called a metal, is mounted radially inside the boss 12d, thereby enabling the output shaft 34 to rotate smoothly without rattling to the boss 12d.

A plurality of reinforcement ribs 12e radially extending about the boss 12d are integrally provided radially outside the boss 12d. These reinforcement ribs 12e are arranged between the boss 12d and the bottom wall 12a and have a substantially triangular shape in appearance. Since these reinforcement ribs 12e increase a fixing strength of the boss 12d with respect to the bottom wall 12a, a problem such as that the boss 12d is inclined with respect to the bottom wall 12a is prevented from occurring.

Furthermore, a bearing member accommodation part 12f is integrally provided in a position offset from the boss 12d of the bottom wall 12a. The bearing member accommodation part 12f is formed in a bottomed cylindrical shape and protrudes in the same direction as that in which the boss 12d protrudes. A ball bearing 33 (see FIG. 3) rotatably supporting a tip side of a pinion gear 31 is accommodated inside the bearing member accommodation part 12f.

Here, as illustrated in FIG. 2, a retaining ring 12g is provided between the boss 12d and the output shaft 34. Accordingly, the output shaft 34 is prevented from rattling in an axial direction of the boss 12d. Thus, sufficient quietness of the motor 10 with the speed reduction mechanism is ensured.

The cover member 13 forming the housing 11 is formed in a substantially flat plate shape by injection molding a resin material such as plastic. Specifically, the cover member 13 includes a main body portion 13a and a cover flange 13b integrally provided around the main body portion 13a. The cover flange 13b is abutted against the case flange 12c via a sealing member (not illustrated) such as an O-ring. Accordingly, rainwater or dust or the like is prevented from entering the housing 11.

A motor accommodation part 13c accommodating the brushless motor 20 (see FIG. 3) is integrally provided in the main body portion 13a of the cover member 13. The motor accommodation part 13c is formed in a bottomed cylindrical shape and protrudes to a side opposite the casing 12 side. The motor accommodation part 13c faces the bearing member accommodation part 12f of the casing 12 with the cover member 13 mounted on the casing 12. A stator 21 (see FIG. 3) of the brushless motor 20 is fixed inside the motor accommodation part 13c.

Furthermore, a connector connection part 13d to which an external connector (not illustrated) on the vehicle side is connected is integrally provided in the main body portion 13a of the cover member 13. Inside the connector connection part 13d, one end side of a plurality of terminal members 13e (only one is illustrated in FIG. 1) for supplying a drive current to the brushless motor 20 is exposed. The drive current is supplied from the external connector to the brushless motor 20 via these terminal members 13e.

Between the other end side of the plurality of terminal members 13e and the brushless motor 20, a control board (not illustrated) is provided that controls a rotation state (such as rotation speed or rotation direction) of the brushless motor 20. Accordingly, the wiper member fixed to a tip side of the output shaft 34 is swung within the predetermined wiping range on the windshield. The control board is fixed inside the main body portion 13a in the cover member 13.

As illustrated in FIG. 3, the brushless motor 20 accommodated inside the housing 11 includes the stator 21 of an annular shape. The stator 21 is fixed inside the motor accommodation part 13c (see FIG. 1 and FIG. 2) in the cover member 13 in a state of being prevented from rotating.

The stator 21 is formed by laminating a plurality of thin steel plates (magnetic bodies), and is provided with a plurality of teeth (not illustrated) radially inside thereof. Coils 21a of U-phase, V-phase, and W-phase are wound around these teeth a plurality of times by concentrated winding or the like. Accordingly, by supplying the drive current to each of the coils 21a alternately at a predetermined timing, a rotor 22 provided radially inside the stator 21 is rotated at a predetermined driving torque in a predetermined rotation direction.

The rotor 22 is rotatably provided radially inside the stator 21 via a minute gap (air gap). The rotor 22 includes a rotor main body 22a formed in a substantially columnar shape by laminating a plurality of thin steel plates (magnetic bodies). A permanent magnet 22b of a cylindrical shape is mounted on an outer peripheral portion of the rotor main body 22a. Here, the permanent magnet 22b is magnetized so that the N pole and the S pole are alternately arranged in a circumferential direction of the permanent magnet 22b. The permanent magnet 22*b* is firmly fixed to the outer peripheral portion of the rotor main body 22*a* with an adhesive or the like.

In this way, the brushless motor 20 according to the present embodiment is a brushless motor having a surface permanent magnet (SPM) structure in which the permanent magnet 22*b* is fixed to the outer peripheral portion (surface) of the rotor main body 22*a*. However, the present invention is not limited to the brushless motor having the SPM structure, and a brushless motor having an interior permanent magnet (IPM) structure in which a plurality of permanent magnets are embedded in the rotor main body 22*a* can also be adopted.

In place of one permanent magnet 22*b* formed in a cylindrical shape, a plurality of permanent magnets having an arc-shaped cross section in a direction intersecting an axis of the rotor main body 22*a* may be fixed at equal intervals on the surface of the rotor main body 22*a* so that the poles are alternately arranged. Furthermore, the number of poles of the permanent magnet 22*b* may be arbitrarily set to two or four or more according to specifications of the brushless motor 20.

As illustrated in FIG. 3, the speed reduction mechanism 30 accommodated inside the housing 11 includes the pinion gear (first gear) 31 formed in a rod shape and a helical gear (second gear) 32 formed in a disk shape. Here, an axis of the pinion gear 31 and an axis of the helical gear 32 are parallel to each other. Accordingly, compared to a worm speed reducer including a worm and a worm wheel whose axes are orthogonal to each other, the speed reduction mechanism 30 may be made relatively compact in physical size.

The pinion gear 31 is arranged on the brushless motor 20 side (drive source side) of the motor 10 with the speed reduction mechanism, and the helical gear 32 is arranged on the output shaft 34 side (driven object side) of the motor 10 with the speed reduction mechanism. That is, the speed reduction mechanism 30 reduces high speed rotation of the pinion gear 31 having a small number of teeth to low speed rotation of the helical gear 32 having a large number of teeth.

Here, a base end side of the pinion gear 31 is firmly fixed to a rotation center of the rotor main body 22*a* by press fitting or the like, and the pinion gear 31 rotates integrally with the rotor main body 22*a*. That is, the pinion gear 31 is rotationally driven by the rotor 22. The tip side of the pinion gear 31 is rotatably supported by the ball bearing 33. Furthermore, a base end side of the output shaft 34 is firmly fixed to a rotation center of the helical gear 32 by press fitting or the like, and the output shaft 34 rotates integrally with the helical gear 32.

The pinion gear 31 forming the speed reduction mechanism 30 is made of steel (metal) and has a shape as illustrated in FIG. 4 to FIG. 9. Specifically, a mounting part 31*a* formed in a columnar shape is provided on each of the base end side and the tip side of the pinion gear 31, the mounting part 31*a* on the base end side is fixed to the rotor main body 22*a*, and the mounting part 31*a* on the tip side is rotatably supported by the ball bearing 33. That is, a center C1 of the pinion gear 31 (mounting part 31*a*) coincides with the rotation center of the rotor main body 22*a* and the ball bearing 33.

The pinion gear 31 includes a pinion main body 31*b* extending in an axial direction of the pinion gear 31. The pinion main body 31*b* corresponds to a first main body portion in the present invention, and a cross section of the pinion gear 31 in a direction (orthogonal direction) intersecting the axial direction is formed in a circular shape. The pinion main body 31*b* forms a portion serving as a "core" of the pinion gear 31, and is rotated about the center C1. A degree of rigidity (such as bending strength) of the pinion gear 31 depends on the thickness of the pinion main body 31*b*. In the present embodiment, in accordance with the physical size of the motor 10 with the speed reduction mechanism, the thickness of the pinion main body 31*b* (core circle) is set such that a radius $r1 \approx 1.7$ mm (diameter: $2 \times r1 \approx 3.4$ mm), as illustrated in FIG. 8.

Furthermore, the pinion gear 31 includes one (single) helical tooth 31*c* meshed with the oblique tooth 32*c* of the helical gear 32. The helical tooth 31*c* corresponds to a first tooth in the present invention, and is integrally provided around the pinion main body 31*b* into a helical shape. A cross section of the helical tooth 31*c* in the direction (orthogonal direction) intersecting the axial direction of the pinion gear 31 is formed in a crescent shape (shaded portion in FIG. 8). The helical tooth 31*c* is helically connected in the axial direction of the pinion main body 31*b*, and the number of teeth thereof is "1". The rigidity (that is, quality of power transmission efficiency, or the like) of the helical tooth 31*c* depends on the thickness of the helical tooth 31*c*. In the present embodiment, in accordance with the physical size of the motor 10 with the speed reduction mechanism, the size of an imaginary circle (tooth profile circle) VC forming the helical tooth 31*c* is set such that a radius $r2 \approx 2.0$ mm (diameter: $2 \times r2 \approx 4.0$ mm), as illustrated in FIG. 8 ($r2 > r1$).

Here, as illustrated in FIG. 8, a center C2 of the helical tooth 31*c* (center C2 of imaginary circle VC) is eccentric (offset) with respect to the center C1 of the pinion main body 31*b* by a predetermined separation distance L1. In the present embodiment, the separation distance L1 has a value obtained by adding an eccentricity correction amount ($=0.8$ mm) to a reference eccentricity amount ($\approx 1.0$ mm) ($L1 \approx 1.8$ mm). That is, when viewed in the axial direction (direction of arrow A of FIG. 4) of the pinion gear 31, the center C1 of the pinion main body 31*b* and the center C2 of the helical tooth 31*c* are offset from each other. The helical tooth 31*c* (imaginary circle VC) has a larger diameter than the pinion main body 31*b*. Furthermore, the pinion main body 31*b* partially protrudes outside (upper side in the drawing) the imaginary circle VC forming an outer shape of the helical tooth 31*c*.

Accordingly, by making the cross-sectional shape of the pinion gear 31 substantially egg-shaped (non-circular) when viewed in the axial direction of the pinion gear 31, it is possible to ensure sufficient strength of the pinion main body 31*b* and the helical tooth 31*c* while hardly increasing the physical size of the motor 10 with the speed reduction mechanism.

Here, when viewed in the axial direction of the pinion gear 31, an outline LN1 of the pinion main body 31*b* and an outline LN2 of the helical tooth 31*c* are connected to each other by a pair of arc tangents LN3 convex radially outwardly of the pinion gear 31. Accordingly, the outer shape of the pinion gear 31 is formed by smooth curves of various curvatures, and thus, it is possible to accurately manufacture the pinion gear 31 by a "whirling machining method (outer diameter whirling)".

As illustrated in FIG. 8, a portion of the pair of arc tangents LN3 in the pinion gear 31 is each provided with a cladding part 31*d* so as to fill a depressed portion between the pinion main body 31*b* and the helical tooth 31*c*.

In this way, since sufficient strength of the entire pinion gear 31 can be ensured, it is possible to improve power transmission efficiency of the speed reduction mechanism 30. Here, the center C2 of the helical tooth 31*c* (imaginary circle VC) follows a rotation trajectory RT as the pinion main body 31*b* rotates. In other words, the rotation trajectory RT is a reference circle of the helical tooth 31*c*.

As illustrated in FIG. 8, when an auxiliary line AL is drawn from the center C1 of the pinion main body 31*b* toward the center C2 of the helical tooth 31*c* (downward in the drawing), and the auxiliary line AL is further extended to a surface of the helical tooth 31*c*, the auxiliary line AL and the surface of the helical tooth 31*c* intersect. The intersection is a vertex TP of the helical tooth 31*c*.

Next, a design concept of the pinion gear 31 is described with reference to (a) and (b) of FIG. 6 to FIG. 8.

Based on the physical size of the motor 10 with the speed reduction mechanism (see FIG. 1 and FIG. 2), it is considered to increase the strength of the pinion gear 31 without increasing the physical size of the motor 10 with the speed reduction mechanism if possible. Specifically, as illustrated in (a) of FIG. 6, the pinion main body 31*b* having a diameter of 2×r1 is made eccentric by a predetermined separation distance L2 with respect to the helical tooth 31*c* having a diameter of 2×r2. At this design stage, the separation distance L2 between the center C2 of the helical tooth 31*c* and the rotation center C1 of the pinion main body 31*b* is the reference eccentricity amount (≈1.0 mm). Accordingly, it is possible to increase the strength of the pinion gear 31 while hardly increasing the physical size of the motor 10 with the speed reduction mechanism.

On the other hand, as illustrated in (a) of FIG. 6, when the speed reduction mechanism 30 is actuated, in order to prevent interference between the pinion main body 31*b* and the oblique tooth 32*c* of the helical gear 32, the oblique tooth 32*c* needs to be retracted by a retraction dimension BK. That is, a tooth depth H of the oblique tooth 32*c* needs to be reduced by the retraction dimension BK. In such handling, a meshing depth between the helical tooth 31*c* and the oblique tooth 32*c* may be reduced, and a meshing strength between the helical tooth 31*c* and the oblique tooth 32*c* may be reduced. Accordingly, the power transmission efficiency of the speed reduction mechanism 30 is reduced.

In order to avoid this, in the speed reduction mechanism 30 of the present embodiment, as illustrated in (b) of FIG. 6, in order to ensure a sufficient tooth depth H of the helical teeth 32*c*, the pinion main body 31*b* having a diameter of 2×r1 is allowed to escape (made offset) radially outwardly of the helical gear 32. Specifically, the pinion main body 31*b* having a diameter of 2×r1 is made eccentric by the predetermined separation distance L1 with respect to the helical tooth 31*c* having a diameter of 2×r2. A difference between the separation distance L1 and the separation distance L2 in this case is the eccentricity correction amount (=0.8 mm) described above. Accordingly, sufficient meshing strength between the helical tooth 31*c* and the oblique tooth 32*c* is achieved while hardly increasing the physical size of the motor 10 with the speed reduction mechanism.

In the subsequent design stage (final stage), upon confirming whether the speed reduction mechanism 30 is actually operable by simulation (such as FEM analysis) using the finite element method, another problem is discovered. Specifically, at the design stage illustrated in (b) of FIG. 6, the helical tooth 31*c* having a diameter of 2×r2 enters a meshing recess 32*d* between adjacent oblique teeth 32*c* of the helical gear 32 substantially without gaps. In this state, as illustrated in FIG. 7, when the speed reduction mechanism 30 is actuated in a simulation, it is found that a tooth tip portion (portion in the vicinity of vertex TP of FIG. 8) of the helical tooth 31*c* interferes with a tooth tip portion (upper portion in FIG. 7) of the oblique tooth 32*c* (shaded portion in the drawing).

Accordingly, in the present embodiment, as illustrated in FIG. 8, the tooth tip portion of the helical tooth 31*c* is subjected to cutting (fine adjustment) into an arc shape in a minimum minute amount D to the extent that the tooth tip portion of the helical tooth 31*c* does not interfere with the tooth tip portion of the oblique tooth 32*c*. Specifically, as indicated by a two-dot chain line in FIG. 8, the tooth tip portion of the helical tooth 31*c* is provided with a depression 31*e* depressed radially inwardly of the imaginary circle VC of the helical tooth 31*c*. By providing the depression 31*e* in this way, interference between the helical tooth 31*c* and the oblique tooth 32*c* is prevented. Thus, a smooth operation of the speed reduction mechanism 30 becomes possible.

However, if the strength of the pinion gear 31 is reduced due to provision of the depression 31*e*, in a place around the pinion gear 31 where there is sufficient space, specifically, a portion on the pinion main body 31*b* side and outside, for example, another cladding part 31*f* (portion indicated by broken lines in the drawing) having a thickness dimension G can also be provided, as illustrated in FIG. 8. In this case, an outline of the portion forming the another cladding part 31*f* is also convex radially outwardly of the pinion gear 31 and has an arc shape. Accordingly, it is possible to easily and accurately manufacture the pinion gear 31 by using the "whirling machining method (outer diameter whirling)".

As described above, since the cross-sectional shape of the pinion gear 31 is set such that the helical tooth 31*c* has a larger diameter than the pinion main body 31*b*, and the tooth tip portion (portion in the vicinity of vertex TP) of the helical tooth 31*c* is cut in the minimum minute amount D to avoid interference, it is found that a contact state between the helical tooth 31*c* and the oblique tooth 32*c* is sufficiently optimized. More specifically, as illustrated in (a) and (e) of FIG. 9, the helical tooth 31*c* comes into contact with a substantially lateral side of the oblique tooth 32*c* at a contact portion CP, and a direction of a load F applied from the helical tooth 31*c* substantially coincides with a rotation direction Rb of the helical gear 32. In other words, a "pressure angle" of the helical tooth 31*c* to the oblique tooth 32*c* is reduced.

In this way, since both the strength of the pinion gear 31 and the strength of the helical gear 32 are sufficient, and the helical tooth 31*c* does not interfere with the oblique tooth 32*c*, it is found that the power transmission efficiency of the speed reduction mechanism 30 is sufficiently improved.

As illustrated in FIG. 3 to FIG. 7, the helical gear 32 forming the speed reduction mechanism 30 is formed in a substantially disk shape by injection molding a resin material such as plastic. Specifically, the helical gear 32 includes a gear main body 32*a*. The gear main body 32*a* has a circular cross section in a direction (orthogonal direction) intersecting an axial direction of the helical gear 32. The gear main body 32*a* corresponds to a second main body portion in the present invention. The base end side of the output shaft 34 is fixed to a rotation center of the gear main body 32*a*, and a cylindrical part 32*b* extending in the axial direction of the output shaft 34 is integrally provided on an outer peripheral portion of the gear main body 32*a*.

A plurality of oblique teeth (second teeth) 32*c* are integrally provided radially outside the cylindrical part 32*b*, that is, around the gear main body 32*a*, so as to be arranged side by side in a circumferential direction of the cylindrical part 32*b*. These oblique teeth 32*c* are provided inclined at a predetermined angle with respect to the axial direction of the helical gear 32, and are meshed with the helical tooth 31*c* of the pinion gear 31. Accordingly, the helical gear 32 is rotated as the helical tooth 31*c* rotates. The number of teeth of the oblique tooth 32c of the helical gear 32 is "40". That is, in the present embodiment, a speed reduction ratio of the speed reduction mechanism 30 is "40". Deceleration is achieved at which, when the pinion gear 31 makes 40 rotations, the helical gear 32 finally makes one rotation.

The meshing recess 32d where the helical tooth 31c of the pinion gear 31 may enter is provided between adjacent oblique teeth 32c. That is, the meshing recess 32d is also inclined at a predetermined angle with respect to the axial direction of the helical gear 32, like the oblique tooth 32c. A center of curvature C3 of the meshing recess 32d is arranged on a reference circle BC1 of the helical gear 32. The helical tooth 31c (shaded portion in FIG. 8) having a radius r2 may enter the meshing recess 32d substantially without gaps.

Here, the tooth depth H of the oblique tooth 32c is a height from a root circle BC2 passing through a deepest portion of the meshing recess 32d to the reference circle BC1 (see FIG. 5). An angle formed by adjacent meshing recesses 32d is "9 degrees" in the present embodiment since the number of teeth of the helical gear 32 is "40" and the number of the meshing recesses 32d is also "40".

Next, an operation of the speed reduction mechanism 30 formed as described above, that is, a meshing operation between the pinion gear 31 and the helical gear 32, is described in detail with reference to the drawings.

As illustrated in (a) of FIG. 9, when the pinion gear 31 is driven by the brushless motor 20 (see FIG. 3) to be rotated in a direction of arrow Ra, the helical tooth 31c is meshed with the oblique tooth 32c. Accordingly, a driving force (load F) from the helical tooth 31c is transmitted to a side of the oblique tooth 32c at the contact portion CP. Such a meshing operation (contact portion CP) of the helical tooth 31c with respect to the oblique tooth 32c gradually moves in the axial direction of the pinion gear 31 and the helical gear 32 as the pinion gear 31 and the helical gear 32 rotate. Since the oblique tooth 32c is inclined with respect to the axial direction of the helical gear 32, the helical gear 32 is accordingly rotated at a speed lower than that of the pinion gear 31.

Here, as illustrated in (a) to (e) of FIG. 9, when focusing only on a portion of the pinion gear 31 and the helical gear 32 in the axial direction, since the pinion gear 31 makes one rotation in the direction of arrow Ra, as illustrated in (a) to (e) of FIG. 9, the helical tooth 31c climbs over one oblique tooth 32c (star in the drawings). Accordingly, as illustrated in (e) of FIG. 9, the helical tooth 31c that has made one rotation is meshed with the next oblique tooth 32c (star in the drawings). As illustrated in (b) to (d) of FIG. 9, while the helical tooth 31c of one portion of the pinion gear 31 in the axial direction is not meshed with the oblique tooth 32c, the helical tooth 31c of the other portion of the pinion gear 31 in the axial direction of is meshed with the oblique tooth 32c.

In this way, when the helical tooth 31c makes one rotation, the helical gear 32 is rotated in the amount corresponding to one oblique tooth 32c (see the movement state of the oblique tooth 32c marked with a star in the drawings). That is, while the pinion gear 31 makes one rotation, the helical gear 32 is rotated by 9 degrees. In other words, by making 40 rotations of the pinion gear 31, one rotation of the helical gear 32 is finally made (speed reduction ratio:40). Thus, the helical gear 32 is rotated at a rotational torque (high torque) 40 times that of the pinion gear 31.

As described in detail above, according to the present embodiment, when viewed in the axial direction of the pinion gear 31, the center C1 of the pinion main body 31b and the center C2 of the helical tooth 31c are offset from each other, the helical tooth 31c has a larger diameter than the pinion main body 31b, and the pinion main body 31b partially protrudes outside the imaginary circle VC forming the outer shape of the helical tooth 31c.

Accordingly, the shape (cross-sectional shape) of the pinion gear 31 when viewed in the axial direction of the pinion gear 31 can be made a shape (substantially egg-like non-circular shape) in which the pinion main body 31b (core circle) partially protrudes outside the imaginary circle (tooth profile circle) VC forming the outer shape of the helical tooth 31c. Accordingly, the strength of the pinion gear 31 can be improved while an increase in the diameter of the pinion gear 31 is suppressed. Thus, the strength of both the pinion gear 31 and the helical gear 32 can be improved, and power transmission efficiency between both gears can be improved. Thus, it is possible to easily handle a relatively large speed reduction ratio.

According to the present embodiment, when viewed in the axial direction of the pinion gear 31, the outline LN1 of the pinion main body 31b and the outline LN2 of the helical tooth 31c are connected to each other by the pair of arc tangents LN3 convex radially outwardly of the pinion gear 31.

Accordingly, the outer shape of the pinion gear 31 can be formed by smooth curves of various curvatures, and thus, it is possible to easily and accurately manufacture the pinion gear 31 by using the "whirling machining method (outer diameter whirling)".

Furthermore, according to the present embodiment, the helical tooth 31c is provided with the depression 31e depressed radially inwardly of the imaginary circle VC of the helical tooth 31c.

Accordingly, interference between the helical tooth 31c and the oblique tooth 32c can be prevented, and a smooth operation of the speed reduction mechanism 30, that is, a smooth meshing operation between the helical tooth 31c and the oblique tooth 32c, becomes possible. Thus, the power transmission efficiency of the speed reduction mechanism 30 can be improved, and thus, power consumption of the brushless motor 20 as the drive source can be suppressed.

According to the present embodiment, sufficient strength of the pinion gear 31 and the helical gear 32 can be ensured and a long service life can be expected, and power consumption of the brushless motor 20 as the drive source can be suppressed. Accordingly, it is possible to save energy related to manufacturing and operation. Thus, in the Sustainable Development Goals (SDGs) led by the United Nations, contributions can be made in particular to Goal 7 ("ensure access to affordable, reliable, sustainable and modern energy for all") and Goal 13 ("take urgent action to combat climate change and its impacts").

It goes without saying that the present invention is not limited to the above embodiment and can be modified in various ways without departing from the gist thereof. For example, the above embodiment has illustrated that the speed reduction mechanism 30 is applied in the drive source of the wiper device mounted on the vehicle. However, the present invention is not limited thereto. The speed reduction mechanism can be applied in any other drive source, such as a drive source of a power window device, a drive source of a sunroof device, and a drive source of a seat lifter device.

For example, the above embodiment has illustrated that the speed reduction mechanism 30 is driven by the brushless motor 20. However, the present invention is not limited thereto. The speed reduction mechanism can also be driven by a brushed motor or the like in place of the brushless motor 20.

The material, shape, dimension, number, installation place and the like of each component in the above embodiment are arbitrary if the present invention can be achieved, and are not limited to the above embodiment.

The invention claimed is:

1. A speed reduction mechanism, comprising a first gear and a second gear, wherein
the first gear comprises:
  a first main body portion, having a circular cross section in a direction intersecting an axial direction of the first gear; and
  one helical tooth, helically provided around the first main body portion and having a crescent-shaped cross section in the direction intersecting the axial direction of the first gear;
the second gear comprises:
  a second main body portion, having a circular cross section in a direction intersecting an axial direction of the second gear; and
  a plurality of oblique teeth, provided around the second main body portion and meshed with the helical tooth;
when viewed in the axial direction of the first gear,
a center of the first main body portion and a center of the helical tooth are offset from each other;
the helical tooth has a larger diameter than the first main body portion; and
the first main body portion partially protrudes outside an imaginary circle forming an outer shape of the helical tooth.

2. The speed reduction mechanism according to claim 1, wherein
when viewed in the axial direction of the first gear, an outline of the first main body portion and an outline of the helical tooth are connected to each other by an arc tangent that is convex radially outwardly of the first gear.

3. The speed reduction mechanism according to claim 1, wherein
the helical tooth is provided with a depression depressed radially inwardly of the imaginary circle of the helical tooth.

4. The speed reduction mechanism according to claim 2, wherein
the helical tooth is provided with a depression depressed radially inwardly of the imaginary circle of the helical tooth.

* * * * *